March 1, 1949.  M. MUSKAT ET AL  2,463,297
APPARATUS FOR TESTING INSULATING MATERIALS
Filed Dec. 21, 1944                          2 Sheets-Sheet 1
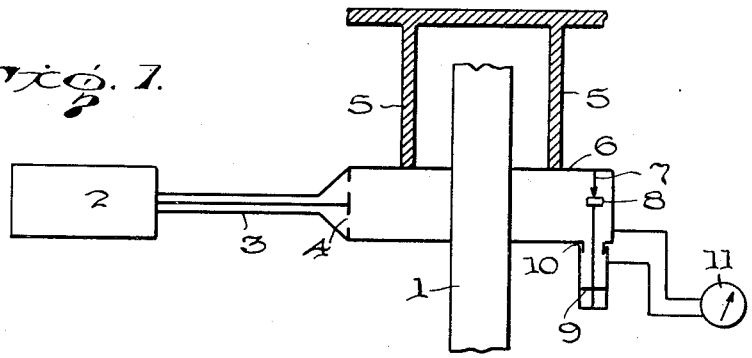
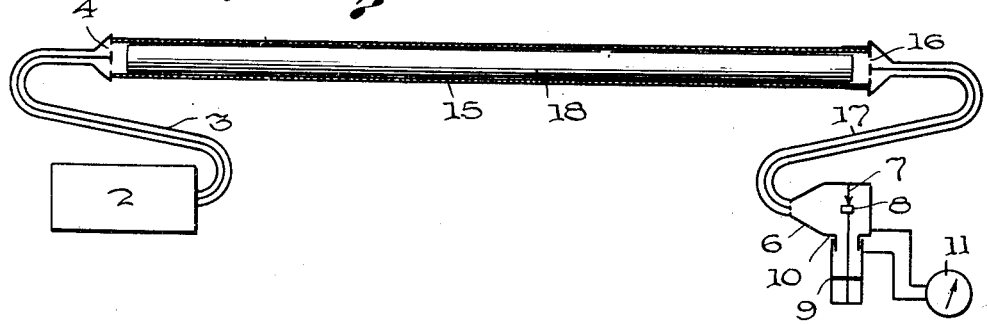
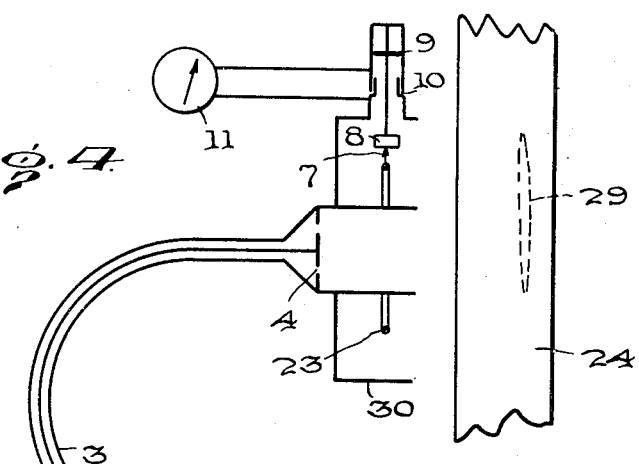
Inventors
MORRIS MUSKAT
NORMAN D. COGGESHALL
By G. M. Houghton
Their Attorney

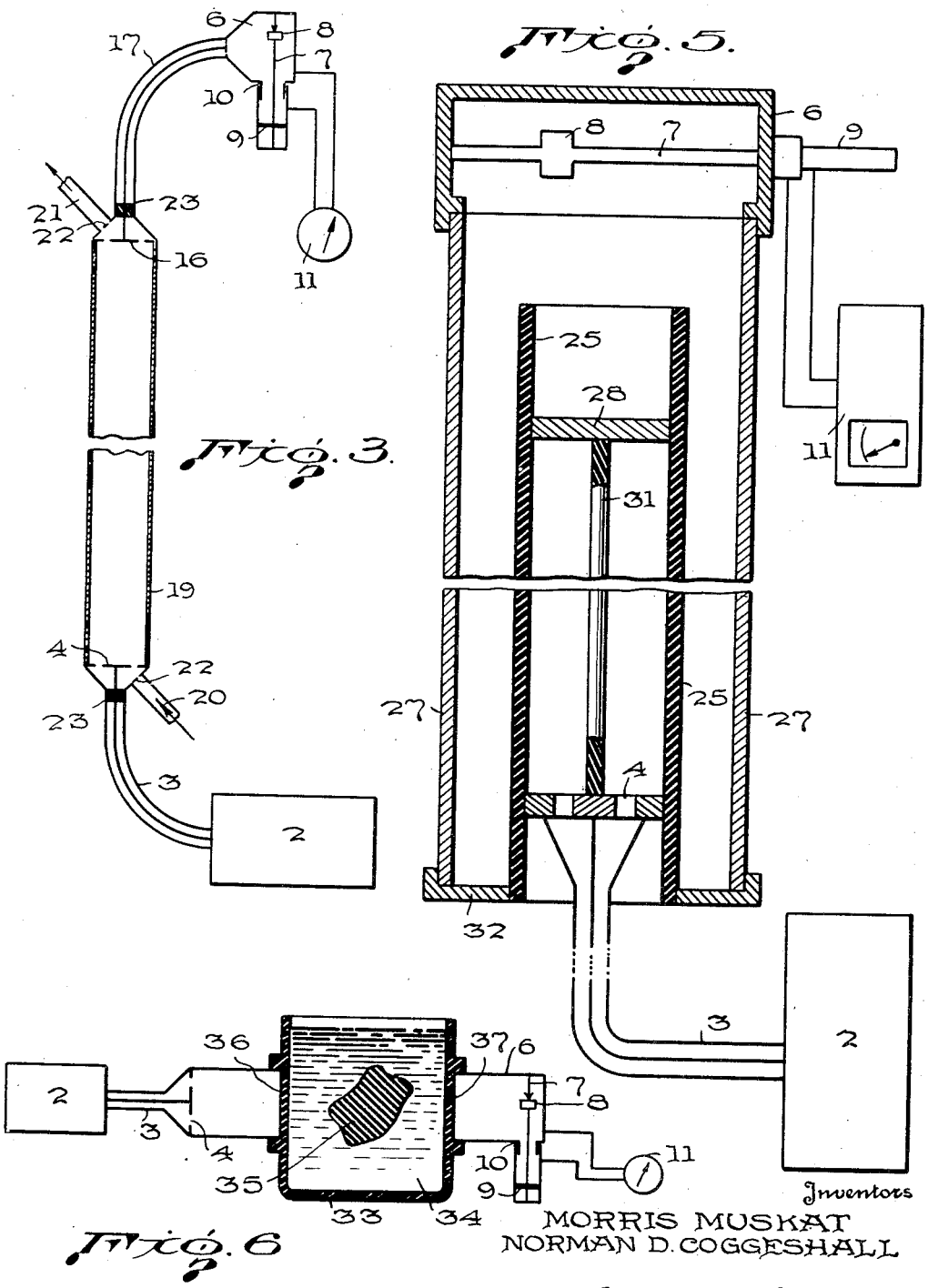

Patented Mar. 1, 1949

2,463,297

UNITED STATES PATENT OFFICE 2,463,297

APPARATUS FOR TESTING INSULATING MATERIALS

Morris Muskat, Oakmont, and Norman D. Coggeshall, O'Hara Township, Allegheny County, Pa., assignors to Gulf Research & Development Company, Pittsburgh, Pa., a corporation of Delaware Application December 21, 1944, Serial No. 569,225

1 Claim. (Cl. 175—183)

This invention concerns apparatus for testing insulating materials, in particular it concerns apparatus for testing the transparency of such materials to the type of energy commonly known as microwaves.

In the testing and inspection of electrical insulating materials which are to be used in very high frequency electrical apparatus, it is necessary to measure the properties of the material at the frequencies at which the apparatus is designed to operate. This is due to the fact that the ordinary electrical properties of insulating materials do not reflect the properties which these materials have at the very high electromagnetic frequencies. This is particularly true for microwave frequencies. Energy losses in microwave apparatus may occur in the insulating materials used in its construction. This results in the production of heat and a reduction in operating efficiency. Many ordinarily good insulators are poor or dissipative insulators at microwave frequencies.

The manufacture of efficient microwave apparatus requires the use of non-dissipative insulating material. Such materials are used to support various internal structures in microwave generators and receivers. They are used for supports in microwave antennae or radiators. Considerable quantity is also used in the manufacture of coaxial cable for transmitting microwave energy from the generator to the radiator, the central conductor of such a coaxial cable being held in place by insulating spacers. In all of these uses the insulators should absorb no energy, and a test is required to determine this before fabrication.

This invention uses for a criterion of the nondissipative quality of the insulating material its transparency to a microwave beam. If a beam of energy strikes a new medium the energy may be either reflected or transmitted. If it is transmitted, the transmission may take place with loss of energy or without such loss. In the latter case the material is said to be transparent. If during the transmission, energy is transformed to some other form, the material is said to absorb energy, and particularly if the energy beam is converted into heat, the medium is said to dissipate the energy. Obviously a uniform medium which is non-dissipative is transparent to the beam. Electrical insulators fall in the class of transparent or partially transparent microwave media. Good electrical conductors act as good microwave reflectors; they do not transmit microwave energy into their interior. We may therefore use the microwave transparency of an insulating material as a measure of its microwave nondissipative quality.

In addition to the possibility of insulating material having undesrable microwave transmisson characterstics, there is also the possibility of such material occasionally having metallic or conducting inclusions which may act as reflectors of microwave energy. Such inclusions may be due to manufacturing defects or may be due to internal decomposition or ageing. Such conductive defects may not be dissipative in themselves but may be reflectors of microwave energy, and interfere with the regular transmission or propagation of microwave energy through the insulating material, thus causing the apparatus to behave in an abnormal and unpredictable manner. It is accordingly an object of this invention to provide apparatus for testing insulating materials for their efficiency in transmitting microwave beams.

A further object of this invention is to provide apparatus for testing insulating materials for their dissipative action when subject to microwave energy.

Still another object of this invention is to provide apparatus for testing insulating materials for internal defects of a character non-transparent to microwaves.

Still another object of this invention is to provide apparatus for testing insulating materials for internal defects of a character reflecting microwaves.

This invention will be more fully understood in detail by reference to the accompanying drawings, in which Fig. 1 shows an embodiment for testing the microwave transparency of materials.

Fig. 2 shows an embodiment for testing the microwave transparency of insulating material having the form of a bar or rod.

Fig. 3 shows an embodiment for testing the microwave transparency of insulation liquids.

Fig. 4 shows an embodiment for testing insulating materials for microwave reflecting inclusions.

Fig. 5 shows an embodiment which is particularly adapted to testing the microwave transparency of insulating material having the form of a tube.

Fig. 6 shows a form which is useful in testing the microwave transparency of irregularly shaped bodies.

In each of the figures equivalent parts are indicated by the same numeral.

Referring to Fig. 1, the numeral 1 represents the insulating material whose microwave transparency is being tested, 2 represents a generator of microwave energy, such as a Klystron, connected by a coaxial cable 3 to a beam-forming radiator such as an electromagnetic horn 4 mounted on support 5. These devices are known in the microwave art. Also fastened to the support is a known type of microwave receiver 6 having a conducting probe 7, crystal rectifier 8 and tuning pinion 9. Upon receiving microwave energy this system gives rise to a D.-C. potential across condenser 10. This potential is a measure of the intensity of the microwave beam and may be measured by means of D.-C. meter 11. Thus one may "shine" a beam of microwave energy through the insulating material, and compare the intensity which is transmitted by the material with that observed when the material is absent, and thus determine the microwave transparency of the material. By moving the material about with respect to the beam, one may locate regions of absorption or other microwave defects. Complete microwave opacity would be indicated by zero reading on meter 11. The microwave produced by 4 need not be a parallel beam, but may be a divergent or convergent one, or may have rays in many directions only some of which enter receiver 6.

Fig. 1 is primarily adapted for testing insulating material in the form of sheets or other shapes having parallel sides. Irregular shapes may be immersed in a microwave transparent medium contained in a parallel sided tank as shown in Fig. 6. Here 33 is a container made of insulating, microwave transparent material having parallel sides 36 and 37, and containing an insulating liquid such as oil having microwave properties similar to those of the material 35 being tested. The material 35 being tested is in the microwave beam and is immersed in the liquid 34 in order to avoid erroneous readings resulting from surface or interfacial reflections. The tank 33 may be long in the direction normal to the microwave beam so that round or irregularly shaped rods may be inspected. Alternatively also the microwave radiator 4 and receiver 6 may be themselves immersed in the medium 34 inside the tank.

Fig. 2 shows apparatus for testing insulating bars or rods. Here 2 is a microwave generator connected by coaxial cable 3 to radiator 4. Radiator 4 is placed at one end of an internally polished tube 15 made of a good electrical conductor, preferably metal. The microwave radiation from 4 will travel inside the tube 15 without attenuation and excite receiver 16 connected by coaxial cable 17 to detector 6 which is similar in construction to that used in Fig. 1. A reading of intensity is obtained on D.-C. meter 11. Upon introducing into tube 15 a bar of insulating material 18 to be tested, any attenuation which is observed will be indicative of a dissipative inclusion in the insulating bar 18 being tested. Such inclusions may be further localized by examining the rod transversely in a microwave beam as indicated in Fig. 6.

In Fig. 3 we have indicated a way of examining insulating liquids for their microwave transparency. Such liquids as various types of oils may be used for cooling as well as insulating media in microwave generators. In Fig. 3 like numbered parts have the same form and function as in Fig. 2. The liquid under test may be passed into the conducting tube 19 at one end through opening 20 and removed at the other end through opening 21. In order for the openings to produce a minimum disturbance to the microwave system they are supplied with covers 22 having fine perforations through which the liquid may pass. Insulating bushings 23 prevent the oil from entering the coaxial cable. The dimensions of tube 19 may be adjusted to the rate of fluid flow to be handled and the frequency of microwaves to be used.

In Fig. 4 we have shown an application of our invention to the testing of insulating materials which are suspected of having reflecting, e. g. partially conducting, inclusions. Such conducting inclusions may result from impurities or from defects in manufacture of the insulators. Here 2 is a Klystron generator whose energy is fed by cable 3 to a microwave beam-forming radiator 4. The material 24 being tested is held in the beam of microwave energy radiated from 4 and a short distance away so that any conducting inclusions 29 if present will reflect some of the primary energy to an adjacent receiver. Receiver 23 forms the central conductor of a wave guide 30 which has an annular form around radiator 4. The conductor 23 is connected to probe 7, rectifier 8, and tuning piston 9, the potential across condenser 10 being read on D.-C. meter 11. Thus if the material 29 has no conducting inclusions, meter 11 will show a minimum indication. However, if conducting inclusions are present, microwave energy will be reflected to the receiver 23 and indicated on meter 11. If material 24 is a perfect reflector a maximum indication is obtained on meter 11. Other relative arrangements of primary radiator and reflection detector may be used.

Fig. 5 illustrates apparatus testing tubular insulating materials. In this case it is desired to measure the transparency of the wall of the tube indicated by 25. The microwave generator 2 feeds energy through coaxial cable 3 to radiator assembly 4. A metal plate 28 is placed some distance away from radiator 4 to keep the microwave radiation in tube 25 localized to the region being examined. The metal plate 28 is spaced from radiator 4 by an insulating rod 31. The assembly consisting of parts 4, 28 and 31 may then be moved inside the tube 25 to inspect its entirety. Tube 25 is coaxially surrounded by a larger conducting tube 27 which picks up the energy coming through the walls of the tube 25 under test. One end of the annular space between the two tubes is closed by metal shield 32. Tube 27 guides the microwaves to detector 6 of a known type previously described. Thus any lack of transparency of the walls of tube 25 may be detected by a decreased reading of meter 11. On the other hand complete opacity would result in a zero reading on meter 11.

The meter indicated in the figures by 11 may take the form of a recording device. For continuous testing an amplifier may be used here together with a relay and appropriate mechanisms for throwing out sections of material found to be defective. Furthermore, other known types of microwave generators or detectors may be used for the practice of this invention. The microwave energy employed may have any wave length in the microwave region of electromagnetic radiation, namely from one meter to a fraction of a millimeter. Tests may be made at any frequency, but are advantageously made at the frequency or frequencies to be handled by the apparatus in which the insulating material is to be used.

What we claim as our invention is:

Apparatus for measuring the microwave characteristics of an insulating cylinder comprising, a source of microwave energy, means attached thereto for transmitting the microwave energy into said cylinder, a conducting reflector inside said cylinder to limit the axial flow of microwave energy to a selected portion of said cylinder, a larger conducting cylinder surrounding said insulating cylinder, a receiver of microwave energy in the conducting cylinder, and means for indicating at least one parameter of the microwave energy received and the manner in which such parameter changes from place to place along the insulating cylinder.

MORRIS MUSKAT.
NORMAN D. COGGESHALL.

REFERENCES CITED

The following references are of record in the file of this patent:

UNITED STATES PATENTS

| Number | Name | Date |
|---|---|---|
| 2,075,808 | Fliess | Apr. 6, 1937 |
| 2,085,798 | Gerhard | July 6, 1937 |
| 2,109,843 | Kossner | Mar. 1, 1938 |
| 2,142,648 | Linder | Jan. 3, 1939 |
| 2,197,122 | Bowen | Apr. 16, 1940 |
| 2,197,123 | King | Apr. 16, 1940 |
| 2,222,450 | Trost | Nov. 19, 1940 |
| 2,301,251 | Capen | Nov. 10, 1942 |
| 2,403,289 | Korman | July 2, 1946 |
| 2,423,383 | Hershberger | July 1, 1947 |

OTHER REFERENCES

Short Wave and Television, April 1938, pages 669, 706 and 707.